Patented Apr. 29, 1941

2,240,232

UNITED STATES PATENT OFFICE 2,240,232

PROCESS OF EXTRACTING OIL

Harden F. Taylor and Robert H. Bedford, New York, N. Y., assignors to The Atlantic Coast Fisheries Company, New York, N. Y., a corporation of Maine No Drawing. Application July 6, 1938, Serial No. 217,729

9 Claims. (Cl. 260—412.1)

This invention relates to oil extraction, and more particularly to a method of extracting vitamin-bearing oils from mammalian and fish viscera, including livers, intestines and other organs thereof, which contain vitamin-bearing oils. By "viscera" is meant the whole or any part of the organs of the body cavities.

An object of this invention is to provide a process of extracting oils, preferably vitamin-bearing oils, from mammalian and fish viscera, irrespective of whether the total fat content is high or extremely low and also irrespective of whether the free fatty acids constitute a high or low percentage of the total fats.

Other and additional objects will become apparent from the following description and appended claims.

In accordance with the principles of the instant invention, selected mammalian and fish viscera are treated with a digestion agent, such as an alkali, to digest the oil-containing tissue thereof and preferably also neutralize the fatty acids. Thereafter, the resultant mass is treated with an oil or fat solvent whereby the oil is dissolved therein. The soap and the viscera present in the mass are removed from the solvent containing the oil dissolved therein. Finally, the oil is separated from the solvent.

The viscera which are to be treated by the instant invention may be in the fresh, untreated or preserved state. By "preserved" is meant the application of physical or chemical methods for the purpose of reducing the rate of decomposition of the viscera as such or the constituents within the visceral cells. When the viscera are preserved by chemical means, it may be advantageous to remove the preservative prior to treatment by the instant process.

In the preferred form of the invention, the viscera are comminuted or disintegrated for the purpose of exposing a greater surface to the action of the digestion agent. The viscera may be comminuted or disintegrated in various known manners. Satisfactory results have been obtained when the viscera are disintegrated in a meat grinder.

As above explained, the comminuted or disintegrated viscera are digested with an alkali. In one embodiment of the invention, this is effected by mixing the selected comminuted or disintegrated viscera with an appropriate amount of water and adding the alkali to the resulting mass. In another form of the invention, the alkali is dissolved in an appropriate quantity of water and this aqueous solution of alkali added to the disintegrated viscera, or vice versa. In both of the aforementioned embodiments, the addition of the various substances is performed in conjunction with agitation or stirring.

The digestion may be effected at room temperature, but such a procedure will take considerable time. In order to accelerate the digestion, the mass is cooked and agitated simultaneously. The time and temperature at which this operation is carried out varies with the nature of the viscera being digested.

After the viscera have been digested, the oil solvent is added. Best results are obtained when the oil solvent is added after the digested mass is cooled to a temperature below the boiling point of the solvent, and preferably room temperature. In the preferred form of the invention, the solvent is added gradually to the cooled aqueous mass while the mass is being agitated or stirred. The resulting mixture is formed into a fine emulsion. In the preferred form of the invention, the emulsion is produced by passing the mixture previously described through a colloid mill.

Due to the procedure utilized, the emulsion described immediately preceding also contains soap and viscera dissolved or suspended in the aqueous medium. In order to remove the soap and viscera, the emulsion is broken in any suitable manner. As a consequence, the soap and viscera tissue are separated as hereafter described. In the preferred embodiment of the invention, the emulsion is simultaneously broken and the soap and viscera tissue salted out by the addition of sodium chloride, preferably in the form of an aqueous solution, to the emulsion, the concentration of the sodium chloride depending on the nature of the emulsion. The salted out materials are then removed in any well-known manner. Best results are obtained when the mass is subjected to centrifuging, whereby the soap and viscera are separated from the solvent solution of the oil.

The solvent solution of the oil is then appropriately treated to separate the oil from the solvent. Though various separation procedures may be used, the preferred form of the invention contemplates separating the oil from the solvent by distillation, whereby the solvent is recovered and is capable of further use.

When the soap and viscera are separated from the solvent solution of oil, a small portion of the latter may also be separated therewith. Therefore, the separated soap and viscera are treated with a fresh portion of solvent and the resulting mass again subjected to centrifuging. These operations may be repeated as many times as necessary in order to insure as complete a removal as possible of any oil from the soap and viscera. The resulting solutions of solvent and oil are subjected to distillation, whereby the oil is separated from the solvent and the latter recovered. If desired, these solutions of oil in solvent may be added to the first-obtained solution of solvent and oil and the resulting solution distilled.

As the digestion agent, the instant invention contemplates an alkali. As illustrative examples of alkalis which have given satisfactory results may be mentioned alkali metal hydroxides, such as sodium hydroxide and potassium hydroxide; alkali metal salts, such as, for example, sodium carbonate, potassium carbonate, trisodium phosphate, etc.; ammonia and substituted ammonia compounds, such as ammonium hydroxide, methyl amine, ethyl amine, etc. The aforementioned alkalis may be used singly or in combination with each other or with other alkalis. In the preferred form of the invention, sodium carbonate (soda ash) is employed as the digestion agent.

The quantity of digestion agent employed in the process depends on the nature of the viscera treated. Generally, the quantity of digestion agent is such that there is provided a sufficient concentration of OH ions for digestion of the oil-containing tissue and to neutralize the fatty acids. The digestion action of sodium carbonate is in part at least due to the effect of hydroxyl ions formed by hydrolysis. The greater the concentration, the more rapid the digestion, other conditions being equal. Obviously, therefore, the presence of hydrogen ions will reduce the effectiveness of digestion by a given quantity of sodium carbonate when it is at no time present in excess of saturation. Such a condition in industry may often be encountered owing to the formation of free fatty acids in the viscera oil, which in some cases may be in excess of 50% of the total fat content. To insure sufficient sodium carbonate for digestion, the amount must be varied accordingly, or, if the amount of sodium carbonate to be added appears to be excessive, then a part thereof may be substituted, for example, by ammonium hydroxide, sodium hydroxide or potassium hydroxide.

Though from the foregoing it is apparent that the quantity of digestion agent varies depending upon the nature of the material being treated, satisfactory results have been obtained when the amount of digestion agent is from 3½ to 7½ parts by weight based on 100 parts by weight of the viscera to be treated.

The water added prior to or simultaneously with the digestion agent to the viscera also varies depending on the viscera to be treated. Usually, the quantity of water is at least sufficient to dissolve the soap formed in the digestion step. In the preferred form of the invention, satisfactory results have been obtained when 100 parts of viscera is treated with 100 parts of water and 5 parts of soda ash, the proportions being by weight.

Any oil or fat solvent may be employed in this process. As illustrative solvents which can be employed in the process may be mentioned chlorinated hydrocarbons, such as methylene chloride, ethylene dichloride, etc.; aliphatic esters, such as ethyl acetate, methyl acetate, etc.; and aromatic compounds, such as benzene, etc.

The quantity of solvent employed in the process is also dependent on the nature of the viscera treated. In any case, the quantity of solvent added is sufficient to dissolve the oil. Satisfactory results have been secured when the fat solvent is used in an amount at least approximately twice the weight of the original viscera.

In the preferred form of the invention, the chlorinated hydrocarbons, and specifically ethylene dichloride, are employed. The chlorinated hydrocarbons have a specific gravity higher than that of the brine and soap used or formed in the process. As a consequence, when the soap and viscera are salted out, the solution of the oil in solvent separates in a layer in the lower portion of the vessel, with the result that removal of the soap and viscera can be more expeditiously effected.

The quantity of sodium chloride employed in the salting out operation should be at least equal to the amount necessary to break the emulsion and salt out the soap and viscera. This quantity obviously is dependent on the nature of the materials treated and the quantity of soap and viscera in the emulsion. In the preferred embodiment of the invention, satisfactory results have been secured when sodium chloride is added to the emulsion in the amount of 0.3 part by weight based on 1 part by weight of the original viscera. When the sodium chloride is added in the form of an aqueous solution, then the amount of water of said solution should be approximately equal to the weight of the original viscera.

During the digestion step, the mixture of viscera, digestion agent and water is agitated until the digestion has been completed. When it is desired to accelerate the digestion, the mixture is cooked and agitated simultaneously. As above explained, the time varies with the nature of the viscera. Satisfactory results have been obtained when intestines are cooked for 15 minutes at a temperature in the neighborhood of the boiling point of water, such as, for example, 90° C. When livers constitute the viscera, satisfactory results have been obtained when they are cooked with the digestion agent for 30 minutes at a temperature in the neighborhood of the boiling point of water, such as, for example, 90° C.

In order to more fully explain the invention, there are hereinafter set forth several specific illustrative embodiments of the invention.

*Example I*

1 part of fish intestines, after having been disintegrated in a meat grinder, is treated with 1 part of water and 0.05 part of soda ash. The mixture is continuously agitated and cooked for 15 minutes at 90° C., after which the mixture is cooled to room temperature. 2 parts of ethylene dichloride are then added, the addition of the ethylene dichloride being gradual and while the mass is being agitated. The resulting solvent aqueous mixture is then brought into intimate contact by being passed through a colloid mill, which results in the formation of a fine emulsion of oil-solvent (solution of oil in solvent) in water. To the emulsion is then added a solution consisting of 1 part of water and 0.3 part of sodium chloride. The mixture is then subjected to centrifuging, with the result that the solvent solution of the oil is separated from the mixture.

The solvent solution of oil is then subjected to a distillation, whereby the oil is separated from the solvent, the solvent being recovered for subsequent use.

The sludge resulting from the centrifuging operation may, if desired, be treated with solvent in order to remove any oil which may have been separated therewith. The sludge, after treatment with the solvent, is again centrifuged and the solution of oil in solvent is subjected to distillation in order to separate the oil from the solvent. This may be repeated as many times as desirable.

The proportions herein mentioned are by weight.

*Example II*

Same as Example I, except that fish livers are used instead of intestines, and the cooking is carried out for 30 minutes at 90° C.

The herein described process is capable of use for extracting oil from mammalian and fish viscera, irrespective of whether the total fat content is high or extremely low and irrespective of whether the fatty acids constitute a high or low percentage of total fats. The oil extracted by the instant process is unimpaired, of a high quality, and fit for human consumption.

Since it is obvious that various changes and modifications may be made in the above description without departing from the nature or spirit thereof, this invention is not restricted thereto except as set forth in the appended claims.

We claim:

1. A method of extracting oil from mammalian and fish viscera which comprises treating the selected viscera in a disintegrated state at an elevated temperature with an aqueous solution containing an alkali to digest the oil-containing tissue of said viscera and neutralize the fatty acids, cooling the resulting mass, adding an oil solvent to the cooled mass, producing an emulsion of said mass wherein the solution of oil and solvent is in the dispersed phase, breaking the emulsion, removing the soap and viscera particles obtained when the emulsion is broken from the solution of oil in solvent, and separating the oil from the solvent.

2. A method of extracting oil from mammalian and fish viscera which comprises treating the selected viscera in a disintegrated state at an elevated temperature with an aqueous solution containing an alkali to digest the oil-containing tissue of said viscera and neutralize the fatty acids, cooling the resulting mass, adding an oil solvent to the cooled mass, passing the mass through a colloid mill to produce an emulsion of said mass wherein the solution of oil and solvent is in the dispersed phase, breaking the emulsion, removing the soap and viscera particles obtained when the emulsion is broken from the solution of oil in solvent, and separating the oil from the solvent.

3. A method of extracting oil from mammalian and fish viscera which comprises treating the selected viscera in a disintegrated state at an elevated temperature with an aqueous solution containing an alkali to digest the oil-containing tissue of said viscera and neutralize the fatty acids, cooling the resulting mass, adding an oil solvent to the cooled mass, producing an emulsion of said mass wherein the solution of oil and solvent is in the dispersed phase, breaking the emulsion, centrifuging the broken emulsion to remove the soap and viscera particles formed therein from the solution of oil in solvent, and separating the oil from the solvent.

4. A method of extracting oil from mammalian and fish viscera which comprises treating the selected viscera in a disintegrated state at an elevated temperature with an aqueous solution containing an alkali to digest the oil-containing tissue of said viscera and neutralize the fatty acids, cooling the resulting mass, adding an oil solvent to the cooled mass, passing the mass through a colloid mill to produce an emulsion of said mass wherein the solution of oil and solvent is in the dispersed phase, breaking the emulsion, centrifuging the broken emulsion to remove the soap and viscera particles formed therein from the solution of oil in solvent, and separating the oil from the solvent.

5. A method of extracting oil from mammalian and fish viscera which comprises treating the selected viscera in a disintegrated state at an elevated temperature with an aqueous solution containing sodium carbonate to digest the oil-containing tissue of said viscera and neutralize the fatty acids, cooling the resulting mass, adding ethylene dichloride to the cooled mass, producing an emulsion of said mass wherein the ethylene dichloride-oil solution is in the dispersed phase, breaking the emulsion, removing the soap and viscera particles obtained when the emulsion is broken from the ethylene dichloride-oil solution, and separating the oil from the ethylene dichloride.

6. A method of extracting oil from mammalian and fish viscera which comprises treating the selected viscera in a disintegrated state at an elevated temperature with an aqueous solution containing sodium carbonate to digest the oil-containing tissue of said viscera and neutralize the fatty acids, cooling the resulting mass, adding ethylene dichloride to the cooled mass, passing the mass through a colloid mill to produce an emulsion of said mass wherein the ethylene dichloride-oil solution is in the dispersed phase, breaking the emulsion, removing the soap and viscera particles obtained when the emulsion is broken from the ethylene dichloride-oil solution, and separating the oil from the ethylene dichloride.

7. A method of extracting oil from mammalian and fish viscera which comprises treating the selected viscera in a disintegrated state at an elevated temperature with an aqueous solution containing sodium carbonate to digest the oil-containing tissue of said viscera and neutralize the fatty acids, cooling the resulting mass, adding ethylene dichloride to the cooled mass, producing an emulsion of said mass wherein the ethylene dichloride-oil solution is in the dispersed phase, breaking the emulsion, centrifuging the broken emulsion to remove the soap and viscera particles formed therein from the ethylene dichloride-oil solution, and separating the oil from the ethylene dichloride.

8. A method of extracting oil from mammalian and fish viscera which comprises treating the selected viscera in a disintegrated state at an elevated temperature with an aqueous solution containing sodium carbonate to digest the oil-containing tissue of said viscera and neutralize the fatty acids, cooling the resulting mass, adding ethylene dichloride to the cooled mass, passing the mass through a colloid mill to produce an emulsion of said mass wherein the ethylene dichloride-oil solution is in the dispersed phase, breaking the emulsion by the addition of sodium chloride, centrifuging the broken emulsion to remove the soap and viscera particles formed therein from the ethylene dichloride-oil solution, and separating the oil from the ethylene dichloride.

9. A method of extracting oil from mammalian and fish viscera which comprises treating 1 part of the selected viscera in a disintegrated state at 90° C. with 1 part of water and 0.05 part of soda ash to digest the oil-containing tissue of said viscera and neutralize the fatty acids, cooling the mass, adding 2 parts of ethylene dichloride to the cooled mass, passing the resulting mass through a colloid mill to produce an emulsion of said mass wherein the solution of oil and ethylene dichloride is in the dispersed phase, adding 1 part of water and 0.3 part of sodium chloride to break said emulsion, centrifuging the broken emulsion to remove the soap and viscera particles formed therein from the solution of oil in the ethylene dichloride, and separating the oil from the ethylene dichloride.

HARDEN F. TAYLOR.
ROBERT H. BEDFORD.